Figure 1:
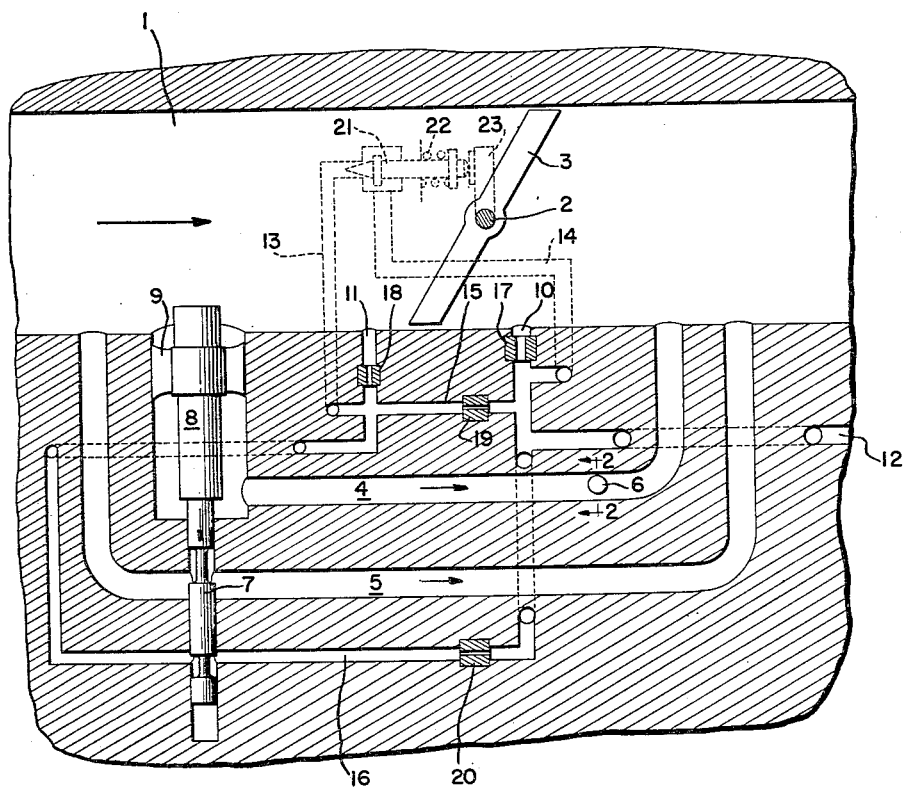

Jan. 28, 1958

H. R. GROEZINGER 2,821,184

IDLING-SPEED CONTROL ARRANGEMENT
FOR INTERNAL COMBUSTION ENGINES
Filed Aug. 27, 1956

INVENTOR
HANS R. GRÖZINGER

BY *Dicke and Craig.*

ATTORNEYS

United States Patent Office 2,821,184
Patented Jan. 28, 1958

2,821,184

IDLING-SPEED CONTROL ARRANGEMENT FOR INTERNAL COMBUSTION ENGINES

Hans R. Groezinger, Stuttgart, Unterturkheim, Germany, assignor to Daimler-Benz Aktiengesellschaft, Stuttgart-Unterturkheim, Germany Application August 27, 1956, Serial No. 606,322

Claims priority, application Germany August 29, 1955

14 Claims. (Cl. 123—140)

The present invention relates to a control arrangement for the idling-speed of internal combustion engines, especially mixture-compressing liquid fuel injection engines, and consists essentially in that a thermostat controlled by the temperature of the suction air of the engine adjusts a throttling or valve member in the idling-speed air line.

By the use of a construction in accordance with the present invention, the internal combustion engine operates unobjectionably during the idling-speed thereof even with relatively elevated temperatures of the suction air in that a sufficient weight of suction air is supplied to the cylinders. Relatively high suction-air temperatures during the idling speed do not only occur when the ambient temperatures, i. e., the temperatures of the atmosphere or the outside air are relatively elevated, for example, in tropical climates, but also in case of more moderate or medium atmospheric temperatures, for example, in those cases in connection with motor vehicles in which the suction air is taken out of or derived from the space within the engine hood or compartment as the air confined in the engine compartment underneath the engine hood heats up relatively quickly during standstill of the vehicle.

The thermostat is preferably arranged, at least in part, in the idling-speed air line itself as it is the temperature of the suction air flowing through the idling-speed air line which is supplied to the cylinders during the idling speed and which, therefore, should be made use of to determine the control effect produced by the thermostat.

According to a further development of the basic inventive concept, the present invention also proposes to provide two idling-speed air lines of which one contains the throttling or valve member which is controlled by the thermostat while the other contains a further throttling or valve member which is manually adjustable, preferably in the manner and by means of the usual idling-speed adjustment screw. In that manner, an exact and accurate separation of the automatic and manual adjustments takes place so that no undesirable mutual interactions occur, and it is also possible to obtain, in case of failure of the thermostatic, automatic adjustment, the desired air quantity by a corresponding manual adjustment.

If the idling-speed air quantity during heat-up is increased in accordance with the present invention, then the weight of the charge or filling in the cylinders remains essentially constant with respect to the operation with a relatively cold suction air whereby the amount of fuel injected could remain constant with liquid fuel injection engines. However, since with higher temperatures, a better preparation of the injected fuel droplets, and lesser condensation on the walls is to be expected, it is recommended in accordance with the present invention to slightly reduce the amount of fuel injected per stroke.

In internal combustion engines, in which the amount of injected fuel is controlled in a known manner by means of a conventional vacuum-controlled fuel adjusting mechanism, which is in communication with the main suction line or inlet manifold by means of a tapped main branch line opening into the main suction line behind the throttle valve and of a tapped correction branch line which opens into the main suction line ahead of the throttle valve and which is connected with the tapped main branch line, the reduction of the fuel quantity may be adjusted in accordance with the present invention in a simple manner which hardly requires additional outlays in that the thermostat additionally controls and adjusts a throttling member in the tapped correction branch line.

In particular, with arrangements in which the tapped correction branch line is connected with the tapped main branch line over a continuously open line having a relatively large cross section for the idling speed operation of the engine and over a line provided with a control member coupled to the control valve of the main suction line for partial-load operation, the present invention proposes that the control member adjustable by the thermostat be arranged in the line having the narrow cross section or in an additional line which is in parallel with this last-mentioned line and which is also provided with a relatively narrow cross section. In such an arrangement, the additional throttle or control member controls in an unobjectionable manner only the quantity of fuel during the idling-speed operation.

Accordingly, it is an object of the present invention to provide an arrangement for internal combustion engines, particularly engines with fuel injection mechanisms, which enables a control adjustment for idling-speed operation of the engine which is simple, inexpensive and reliable in operation.

It is still another object of the present invention to provide an idling speed adjustment for internal combustion engines which compensates for variations in the temperature of the suction air of the engine.

Still another object of the present invention resides in the provision of such a control arrangement for controlling the idling speed operation of the engine which assures a minimum or no interaction between the manual idling speed adjustment and the temperature responsive, automatic idling-speed adjustment in accordance with the present invention.

Another object of the present invention resides in the provision of a control arrangement for the idling-speed adjustment of internal combustion engines which exhibits a great versatility and good response to the various operating conditions.

Figure 2:
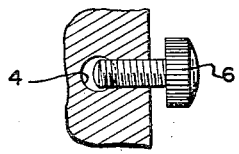

These and other objects, features and advantages in accordance with the present invention will become more obvious from the following description when taken in connection with the accompanying drawing, which shows, for purposes of illustration only, one embodiment of a control arrangement in accordance with the present invention and wherein Figure 1 is a longitudinal cross-sectional view showing a control arrangement for the idling-speed adjustment of an internal combustion engine in accordance with the present invention, and Figure 2 is a partial cross-sectional view taken along line 2—2 of Figure 1 and showing a detail thereof.

Referring now more particularly to the drawing, wherein like reference numerals are used throughout the various views to designate like parts, reference numeral 1 designates the main suction line or intake manifold of an engine, especially an internal combustion engine of the fuel-injection type. The usual throttle valve 3 disposed within the suction line 1 and which controls the cross-sectional opening thereof, is mounted on a shaft 2. Two idling-speed air lines or channels 4 and 5 bypass the throttling valve 3, of which the air line 4 may be adjustably controlled by means of the usual idling-speed adjusting screw 6 (Figure 2) and of which the other air line 5 may be adjustably controlled by means of a sliding valve member 7. While the idling-speed air lines 4 and 5 are shown herein as being connected on both ends thereof with the main suction line 1, it is understood that the forward ends thereof may also be freely open to the atmosphere independently of the main suction line 1 so that independent air-paths are produced thereby.

The sliding valve member 7 is controlled and moved by means of a thermostat 8 of any suitable construction which is retained in place as at 9, for example, by suitable ribs or the like, and which is exposed to and controlled by the air in the suction line 1 and at least in part by the air flowing through the idling-speed air line 4. The amount of injected fuel is controlled in the usual manner by means of a conventional vacuum controlled fuel adjusting mechanism (not shown), as is well known in the art, which is in communication with the suction line 1 over a tapped main branch line 10, 12 and a tapped branch correction line 11, connected to the line 12 leading to the fuel adjusting mechanism, as will be described more fully hereinafter. The vacuum-controlled fuel adjusting mechanism for the fuel injection pump may consist, as is conventional, of a diaphragm which is normally spring-loaded and controlled by the vacuum which prevails at the places where the tapped branch lines open into the main suction line 1 so as to control the fuel adjusting rod or rack by means of the movements of the diaphragm in dependence on this vacuum.

Three lines interconnect the tapped correction branch line 11 with the tapped main branch line system 10, 12, and, more particularly, a partial-load correction branch line 13, 14, a first idling-speed correction branch line 15 and a second idling-speed correction branch line 16. A calibrated orifice or nozzle 17 of relatively large cross section is located behind the tap of the tapped main branch line 10. A nozzle 18 of relatively small cross section is arranged behind the tap of the tapped correction branch line 11, while nozzles 19 and 20 of relatively slight cross section are inserted into the idling-speed correction branch lines 15 and 16. The line 16 is also throttled by a portion of the sliding valve member 7 which is controlled by the thermostat 8.

The smallest or narrowest cross section of the partial-load correction branch line 13 is determined by a needle valve 21 which is spring-loaded by means of spring 22 in such a manner as to tend to fully open at all times the cross section of the partial load correction line system 13, 14. However, the needle valve 21 is also actuated by the lever arm 23 mounted on the throttle valve shaft 2 so as to control thereby the needle valve 21 and bring the same into a more or less closed position depending on the position of the throttle valve 3.

*Operation*

The operation of the adjustable idling-speed control arrangement in accordance with the present invention is as follows:

With a relatively cold suction air the sliding valve member 7 is in its upper position, in which it blocks completely the idling-speed air line 5 whereas line 16 is essentially unthrottled.

Consequently, with a relatively cold suction air and during idling speed, i. e., with the throttle valve 3 essentially completely closed, combustion air is supplied to the engine exclusively over the first idling speed air line or channel 4. If, however, the temperature of the suction air increases, then the amount of air thus supplied would no longer be sufficient for a satisfactory idling-speed operation since, as a result of the higher temperatures, only relatively little oxygen would be supplied to the engine.

In accordance with the present invention, this disadvantage is eliminated in that with an increase in the temperature of the combustion air supplied to the engine, the slide valve member 7 is moved by the thermostat 8 in the direction of the arrow in a downward direction, as viewed in Figure 1, and thereby more or less opens the path for the combustion air over the second idling-speed air channel 5 so that the total amount of combustion air supplied to the engine contains a sufficient amount of oxygen.

Consequently, approximately the same weight of oxygen is supplied to the engine in that case even though the air is warmer. As a result of the better fuel preparation connected therewith, the amount of fuel quantity injected may be reduced. This takes place by closing the correction branch line 16 as the sliding valve member 7 moves downwardly whereby the vacuum in the vacuum line 12 leading to the fuel adjusting mechanism of the injection pump increases which results in a reduction of the amount of fuel injected by the corresponding control effect on the diaphragm.

However, operation or lack of operation of the thermostat 8 leaves the idling-speed air line 4 essentially unaffected since the cross section thereof controlling the flow of idling-speed combustion air therethrough is determined only by the setting, for example, manual setting of the adjustment screw 6.

The nozzle or orifice 19 in line 15 is so chosen as to provide a predetermined control effect by its cross section to properly adjust the vacuum in line 12 when, for example, the throttle valve 3 is opened and/or the temperature of the suction air becomes relatively warm.

While I have shown and described one preferred embodiment in accordance with the present invention, it is understood that the same is not limited thereto but is susceptible of various changes and modifications within the spirit of the present invention, and I intend to cover all such modifications and changes except as defined by the appended claims.

I claim:

1. A control arrangement for adjusting the idling-speed quantity of suction air of an internal combustion engine, particularly of a liquid fuel injection engine, comprising an idling-speed air-line provided with control means for controlling the cross section thereof, and thermostatic means exposed to said suction air and operatively connected to said control means for adjusting said control means in dependence on the temperature of said suction air.

2. A control arrangement according to claim 1, wherein said thermostatic means is exposed at least in part to the suction air flowing through said idling-speed air line.

3. A control arrangement for adjusting the idling-speed quantity of combustion air of an internal combustion engine, particularly of a liquid fuel injection engine, comprising conduit means for the suction air of the engine, an idling-speed air-line in parallel with at least a part of and connected at least at one end thereof to said conduit means, said idling-speed air line including control means for controlling the cross section of said idling-speed air line, and thermostatic means exposed to the suction air and operatively connected to said control means for adjusting said control means in dependence on the temperature of said suction air.

4. A control arrangement according to claim 3, wherein said conduit means includes control means for controlling the cross-sectional area thereof, and wherein said idling-speed air line by-passes said last-mentioned control means.

5. A control arrangement according to claim 4 wherein said thermostatic means is exposed at least in part to the air flowing through said idling-speed air line.

6. A control arrangement for adjusting the idling-speed air quantity of an internal combustion engine, particularly of a liquid fuel injection engine, comprising conduit means for the suction air of the engine, an idling-speed air line connected at least at one end thereof to said conduit means, said idling-speed air line including control means for controlling the cross section thereof, thermostatic means exposed to the suction air flowing at least in part through said air line and operatively connected to said control means for adjusting said control means in dependence on the temperature of said suction air, a further idling-speed air line, and means for manually controlling said further idling-speed air line.

7. A control arrangement according to claim 6, further comprising another idling-speed air line with control means actuated by said thermostatic means for controlling the cross-sectional area of said last-mentioned idling-speed air line in dependence on the temperature of said suction air.

8. A control arrangement according to claim 7, wherein both control means are formed by a unitary slide valve member extending through said first-mentioned idling-speed air line and said another idling speed air line.

9. A control arrangement for adjusting the idling-speed air quantity of an internal combustion engine, particularly of a liquid fuel injection engine, comprising conduit means with a control valve for controlling the flow of suction air to the engine, an idling-speed air line connected at least at one end thereof to said conduit means and provided with control means for controlling the cross section thereof, vacuum-controlled means for controlling the amount of injected fuel including a main branch line opening into said conduit means behind said control valve and a correction branch line connected at one end thereof to said main branch line and at the other end thereof opening into said conduit means ahead of said control valve, said correction branch line being provided with control means for controlling the cross section thereof, and thermostatic means exposed to the suction air flowing at least in part through said air line and operatively connected to both of said control means for actuating both of said control means in dependence on the temperature of said suction air.

10. A control arrangement according to claim 9, wherein said main branch line is provided with a calibrated orifice.

11. A control arrangement according to claim 9, further comprising a further idling-speed air line with means for manually adjusting the cross section thereof.

12. A control arrangement for adjusting the idling-speed air quantity of an internal combustion engine, particularly of a liquid fuel injection engine, comprising conduit means with a control valve for controlling the flow of suction air of the engine, an idling-speed air line connected at least at one end thereof to said conduit means and provided with control means for controlling the cross section thereof, vacuum-controlled means for controlling the amount of injected fuel including a main branch line opening into said conduit means behind said control valve and correction branch line means in communication at one end thereof with said main branch line and opening at the other end thereof into said conduit means ahead of said control valve, said correction branch line means having a first correction branch line portion of relatively narrow cross section for operation at idling-speed and a second correction branch line portion provided with a valve member, means operatively connecting together said first-mentioned valve member with said second-mentioned valve member, control means for controlling the cross section of said first correction branch line portion, and thermostatic means exposed to the suction air flowing at least in part through said air line and operatively connected to both of said control means for adjusting both of said control means in dependence on the temperature of said suction air.

13. A control arrangement according to claim 12, further comprising a third correction branch line portion in parallel with said first branch line portion and provided with a continuously open relatively narrow cross section.

14. A control arrangement according to claim 13, wherein said control means are constituted by a unitary slide valve member.

No references cited.